United States Patent [19]

Namiki

[11] Patent Number: 4,686,672
[45] Date of Patent: Aug. 11, 1987

[54] TDMA COMMUNICATIONS APPARATUS HAVING ADAPTIVE BURST DURATION

[75] Inventor: Junji Namiki, Tokyo, Japan

[73] Assignee: NEC Corporation, Japan

[21] Appl. No.: 659,567

[22] Filed: Oct. 10, 1984

[30] Foreign Application Priority Data

Oct. 13, 1983 [JP] Japan .................................. 58-191492
Oct. 13, 1983 [JP] Japan .................................. 58-191493

[51] Int. Cl.$^4$ ............................. H04J 3/16; H04J 3/06
[52] U.S. Cl. ........................................ 370/95; 370/104
[58] Field of Search .................. 370/104, 99, 95, 80, 370/83

[56] References Cited

U.S. PATENT DOCUMENTS 3,818,453  6/1974  Schmidt et al. ...................... 370/104
4,204,093  5/1980  Yeh ..................................... 370/104
4,256,925  3/1981  Goode ................................. 370/104

Primary Examiner—Douglas W. Olms
Assistant Examiner—Frank M. Scutch, III
Attorney, Agent, or Firm—Laff, Whitesel, Conte & Saret

[57] ABSTRACT

A telecommunication system includes an earth-to-satellite-to earth link over which transmission is made on a time division basis. Each earth station assembles data to be transmitted in bursts during time period assigned to such earth station. The time position has a variable length which corresponds to the amount of data that is to be sent. The time positions are shifted to immediately follow each other with no idle and unused time space in or between adjoining time positions. Thus, each time frame is adaptively changed to fit the instantaneous communications traffic needs.

8 Claims, 15 Drawing Figures

DATA ASSEMBLING CIRCUIT

BURST POSITION DETECTOR

BURST POSITION CONTROL

BURST DURATION DETECTOR

TDMA COMMUNICATIONS APPARATUS HAVING ADAPTIVE BURST DURATION

The present invention relates to a time division multiple access (TDMA) communications apparatus.

A TDMA communications system is used to implement a satellite link for a digital communications network which includes a plurality of earth stations. A prior art TDMA communications system allocates a particular burst duration and particular burst positions in a frame to each earth station. The problem encountered with the prior art TDMA communcations system is than when an unused or idle state occurs in a burst duration allotted to one earth station, due to decreased communications traffic, the other stations in the system cannot utilize the unused or idle duration, thus limiting the efficiency of channel utilization.

It is, therefore, an object of the present invention to provide a TDMA communications apparatus which enables each earth station to adaptively vary its own burst duration in response to its own instantaneous communications traffic needs.

According to one asepct of the present invention, a TDMA communications apparatus has a buffer memory for temporarily storing data which is to be transmitted. An assembling device processes an output of the buffer memory into a predetermined burst format. A burst position control device shifts the processed burst to a desired position in the time frame which is transmitted to a satellite. A receiving means receives all of the bursts contained in the frames. A burst duration detector determines the duration of all of the received bursts and the duration of a burst at the head of the frame received from an output of the receiving means. A detector means detects when the transmitted burst is at the head of the frame. A channel control device responds to an output of the detector means and to an output of the burst duration detector, thus causing the burst position control device to shift the transmitted burst at each predetermined period of time while causing the assembling device to vary the transmitted burst duration.

The present invention will hereinafter be described in detail with reference to the accompanying drawings, wherein:

FIGS. 2 through 6 are block diagrams of main parts of the apparatus shown in FIG. 1;

In the drawings, the same structural elements are designated by like reference numerals. Also, on thick (double) lines, signals are supplied in the parallel form of a plurality of bits while, on thin solid lines, signals are sequentially supplied bit by bit in series.

Figure 1:
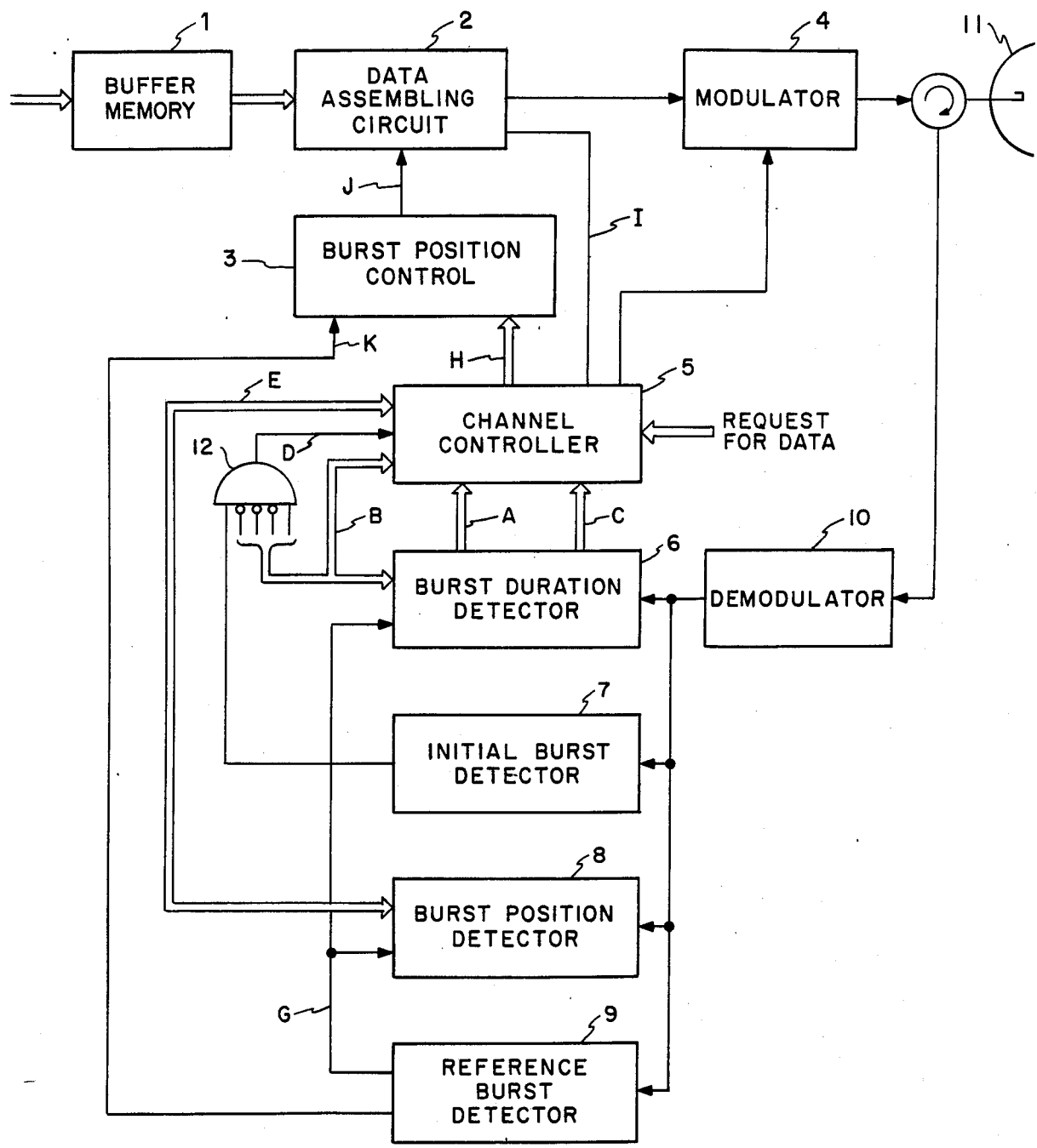
FIG. 1 is a block diagram of an embodiment of the present invention.

The embodiment of FIG. 1 comprises a buffer memory 1 for temporarily storing data to be transmitted and a data assembling circuit 2 for assembling the output data received from the buffer memory 1 in a predetermined format. The assembling circuit 2 supplies the assembled data to a modulator 4 in response to a data increase/decrease request signal I supplied from a channel controller 5 and a burst position control signal J supplied from a burst position controller 3. The modulator 4 modulates the input data by, for example, phase-shift keying. The modulated signal is transmitted to a satellite via an antenna 11.

Meanwhile, a signal which is retransmitted from the satellite is demodulated by a demodulator 10 in return to the original data. Then, that data is supplied to a burst duration detector 6, an initial access burst detector 7, a burst position detector 8, and reference burst detector 9. The detector 9 detects a reference burst R from among the demodulated signal, and then applies it as signal G to the detectors 6 and 8. The burst position controller 3 receives burst R as a reference burst detection signal (RBD signal).

The detector 9 may comprise a shift register and a comparator for detecting a coincidence between the output of the shift register and a unique word (UW) in the reference burst R. The detector also detects a superframe signal which is put into the unique word UW of the reference burst R, once pe twenty successive frames. The detector delivers the superframe to the burst position controller 3 as a superframe signal K. In response to the reference burst detection RBD signal G, the burst length detector 6 detects the duration of each burst in the frame, a number assigned to each burst, and the amount of empty time in the frame.

The detected burst duration, burst numbers, and amount of empty time are fed to the channel controller 5 as a burst duration signal A, a burst number signal B, and an empty time slot signal C, respectively. The control burst detector 7 detects an initial access burst F which is adapted for initial access, inserted in each frame and, then, applies a burst detection signal to a gate 12. When the burst number signal B indicates No. 1, the gate 12 responds to the detection signal of the burst F by applying to the channel controller 5 a head indication signal D which shows that the burst F heads a frame. Also, applied to the channel controller 5 is a burst position detection signal E which is produced by the burst position detector 8, to indicate a position of the station's own burst position in a frame.

The channel controller 5 is composed of a microprocessor which delivers a burst position indication signal H to the burst position controller 3 in response to the signals A to E. The burst position controller 3 supplies the burst position control signal J to the data assembling circuit 2 upon receipt of the burst position indication signal H and the RBD signal G.

Details of the data assembling circuit 2, burst duration detector 6, burst position controller 3 and burst position detector 8 will now be described.

Figure 2:
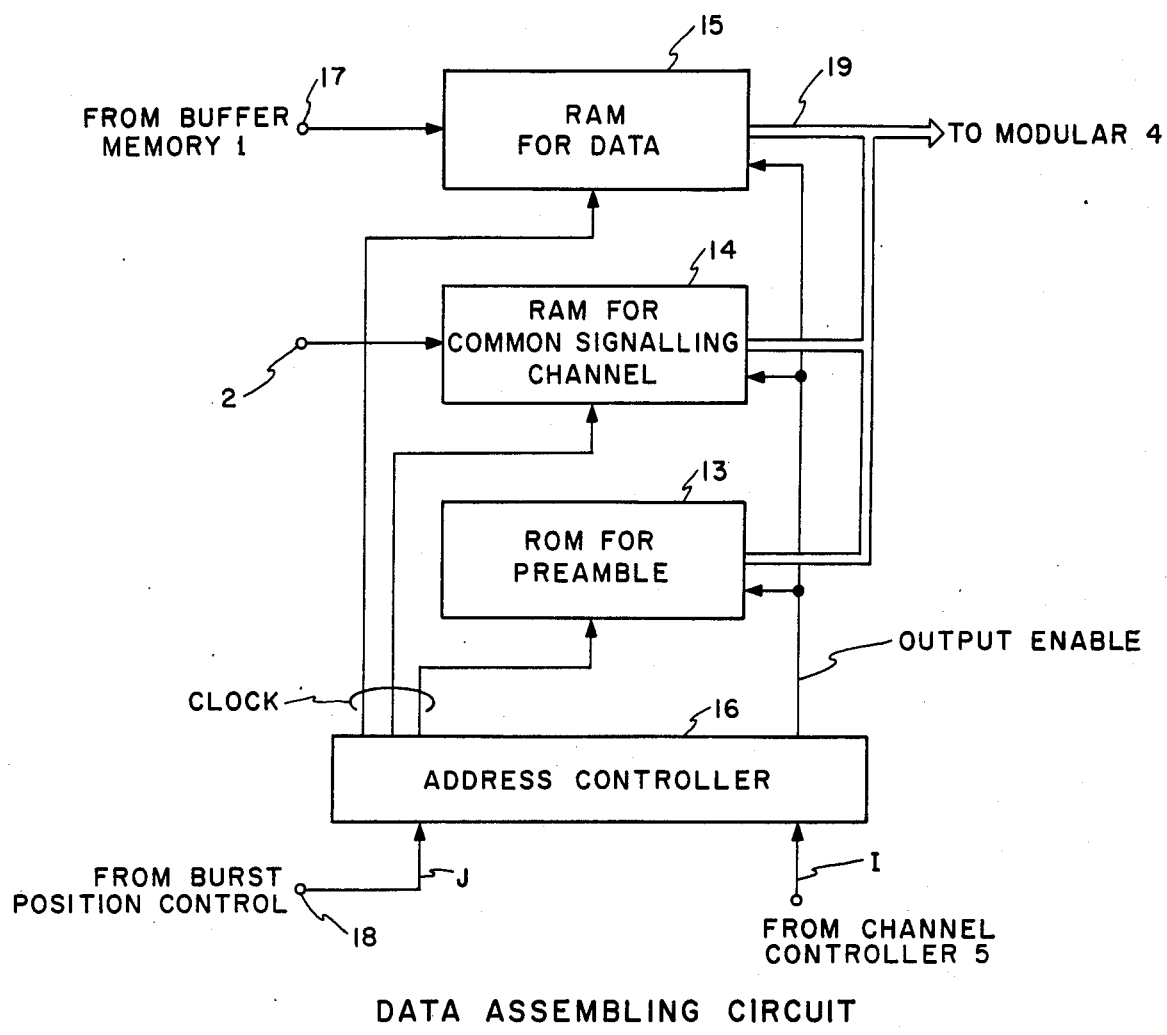

In FIG. 2, the data assembling circuit 2 comprises a random access memory (RAM) 15 for storing data from the buffer memory 1 (FIG. 1). A RAM 14 stores a common signal used for communications between earth stations. A read only memory (ROM) 13 stores a preamble. An address controller 16 controls the read addresses of the RAMs 14 and 15 and ROM 13 in response to the burst position control signal J which is received from the burst position controller 3 (FIG. 1) and to the data increase/decrease request signal I which is received from the channel controller 5.

Figure 3A:
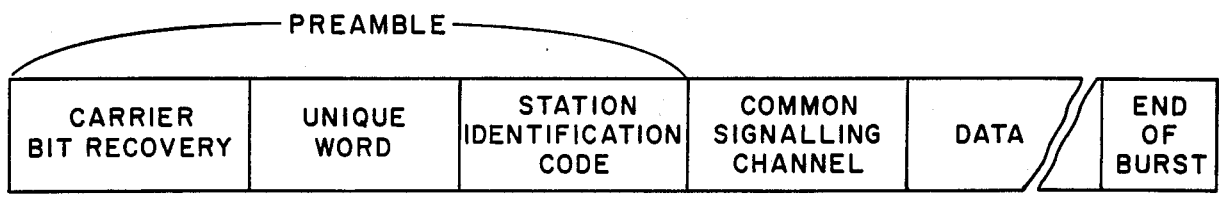
FIGS. 3A and 3B show examples of burst formats.
Figure 3B:
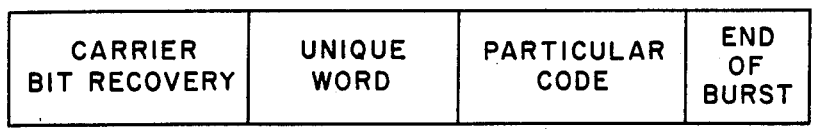

The data sequentially read out of the ROM 13 and RAMs 14 and 15 are multiplexed on a bus 19, in the format shown in FIG. 3A. In FIG. 3A, the multiplexed data comprises a preamble including a carrier bit recovery portion for recovering a carrier and a bit timing, a unique word which is indicative of the beginning of each burst, and a station identification code for designating the transmitting and receiving stations. A common signaling channel portion is used for communications between earth stations. Data is then sent, followed by an end of burst (EOB) portion which is indicative of the end of each burst. The reference burst usually has only the preamble shown in FIG. 3A. On the other hand, the initial access burst F has a preamble containing a particular code showing that the burst duration is fixed, as shown in FIG. 3B.

Figure 4:
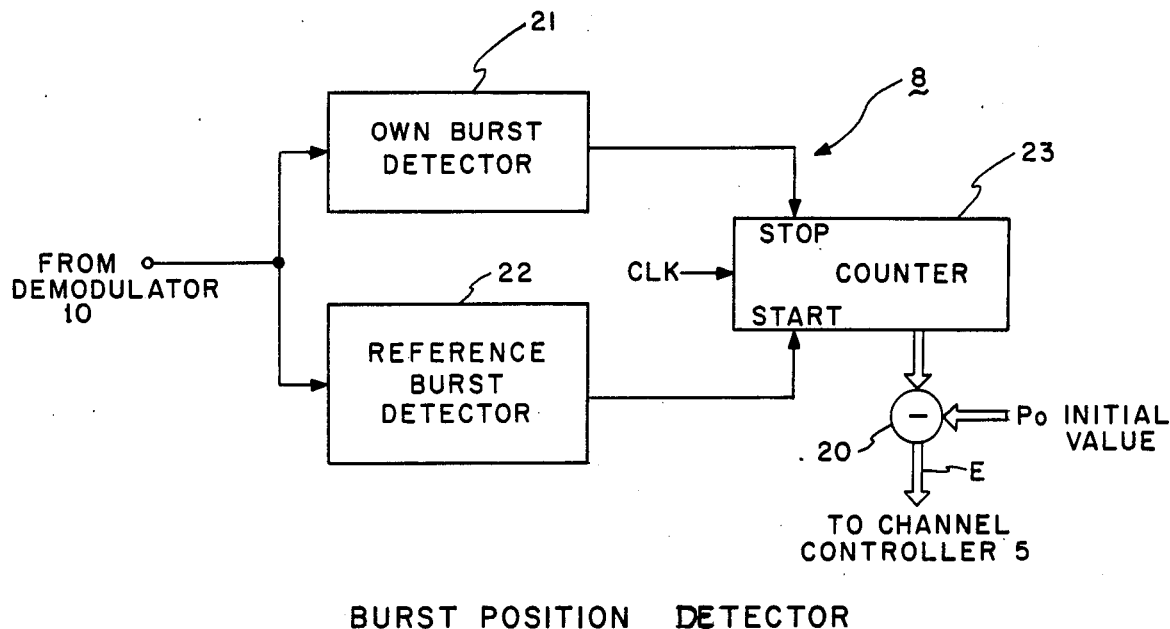

In FIG. 4, the burst position detector 8 comprises an "own burst" detector 21 for detecting the stations' own burst in the unique word UW, a detector 22 for detecting the UW of the reference burst, an counter 23 which begins the counting operation responsive to the RBD signal G and stops the operation responsive to an own burst detection signal, and a subtractor 20 for subtracting from the output of the counter 23 a value $P_o$ corresponding to the carrier bit recovery portion. The own burst detector 21 comprises a UW detector, a station identification code (SIC) detector, and a coincidence detector which operates responsive to coincidence between the SIC and UW detectors.

Figure 5:
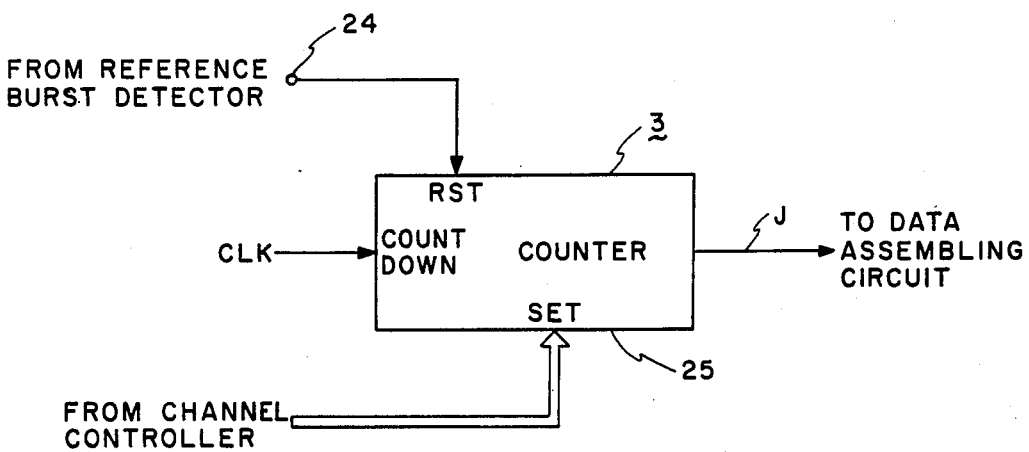

In FIG. 5, the burst position controller 3 comprises a counter 25 which is reset by the RBD signal G coming in through a terminal 24 and is loaded with a value produced from the channel controller 5. Counter 25 counts down the value loaded into it and produces the burst position control signal J when the count down reaches zero.

Figure 6:
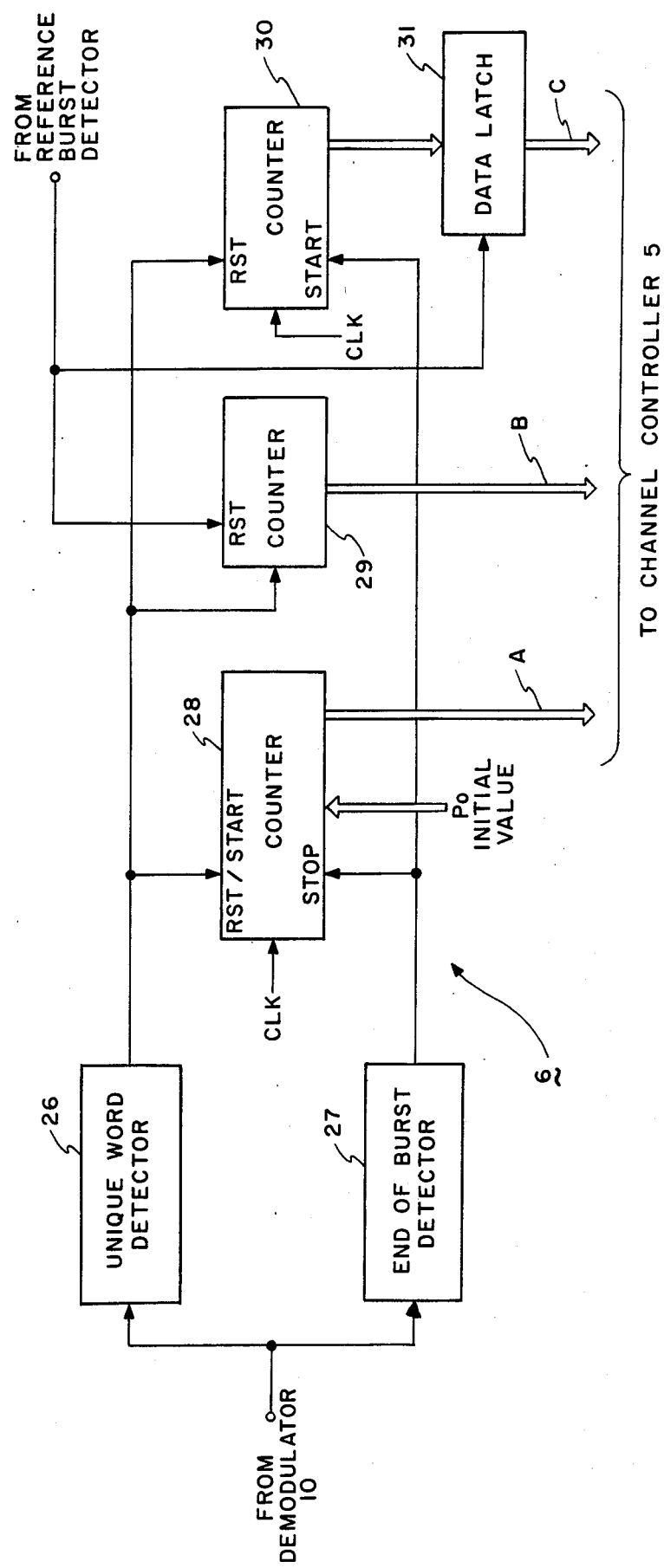

In FIG. 6, the burst duration detector 6 includes a detector 26 for detecting the UW of each burst, and a detector 27 for detecting the EOB portion. A counter 28 starts the counting operation in response to the UW detection signal and stops the counting, in response to the EOB detection signal. Responsive thereto, detector 6 generates the signal A, indicating a burst duration. The initial value which is loaded into the coounter 28 corresponds to the duration of the carrier bit recovery portion. The detector 6 further includes a counter 29 which is reset by the RBD signal G and produces a number of bursts by counting the UW detection signal. Counter 30 is reset by the UW detection signal and then starts the counting operation in response to the EOB detection signal. A latch circuit 31 latches the output of the counter 30 in response to the RBD signal G so as to generate the empty time slot signal C which is indicative of the amount of time in the empty time slot.

The operation of the apparatus constructed as described above will be described with reference to FIGS. 8A to 8F and FIGS. 7A and 7B which are flow charts associated with the channel controllers 5.

Figure 8:
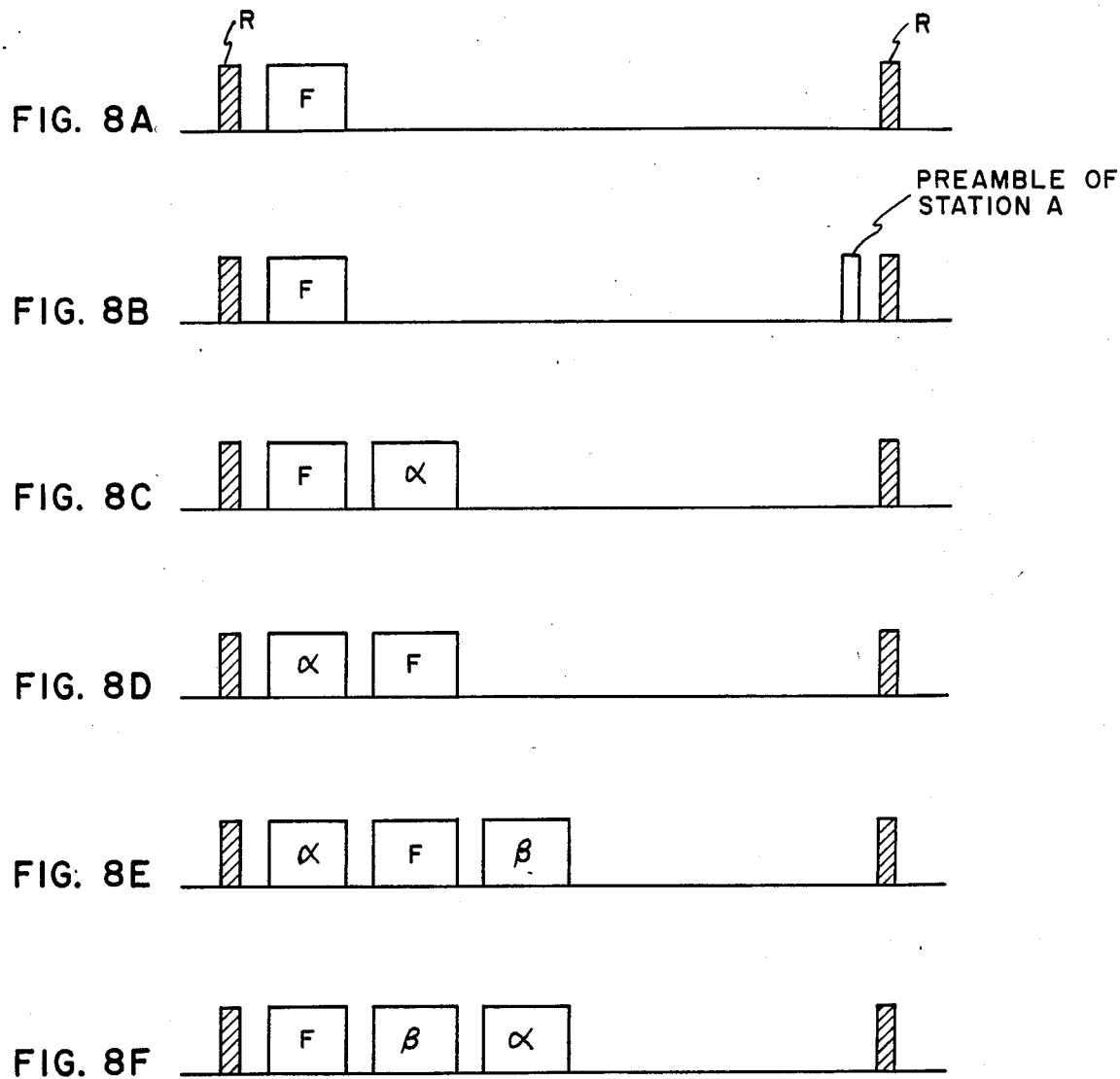
FIGS. 8A to 8F show waveforms describing the operation of the apparatus of FIG. 1.

First, as shown in FIG. 8A, a reference station (not shown) transmits the reference burst R, at each predetermined and cyclically recurring period, and an initial access burst F.

Assume that, in the above situation, a certain earth or ground station A intends to transmit data. The controller 5 (FIG. 1) detects an empty time slot in response to the empty time slot signal C given from the burst duration detector 6. When a request for transmission occurs (steps 100 and 101 in FIG. 7A), the channel controller 5 delivers the burst position indication signal H (FIG. 1) to the position controller 3 (step 102). In response to the request signal I, the RDB signal G, and position indication signal H, the position controller 3 controls the data assembling circuit 2 so that only the preamble is transmitted before the reference burst R (FIG. 8B).

Figure 7A:
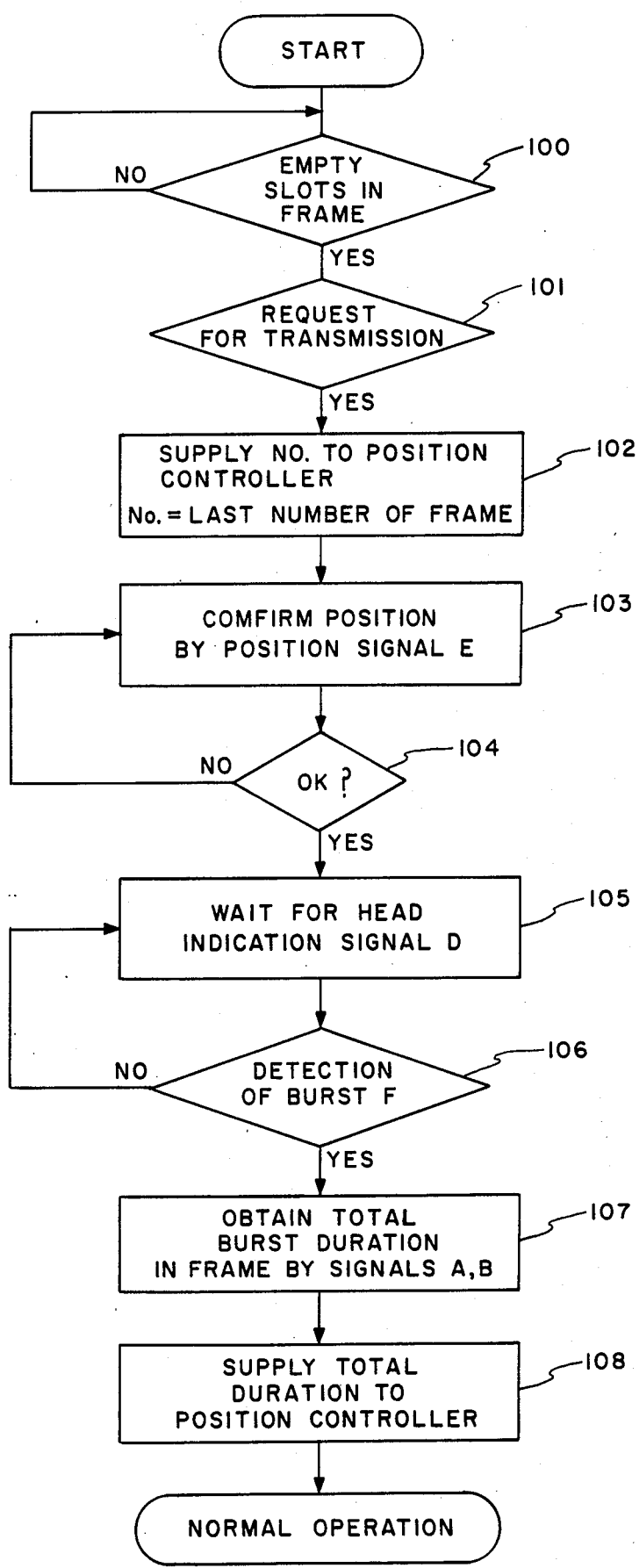
FIGS. 7A and 7B are flow charts describing the operation of a controller 5 included in the apparatus of FIG. 1.
Figure 7B:
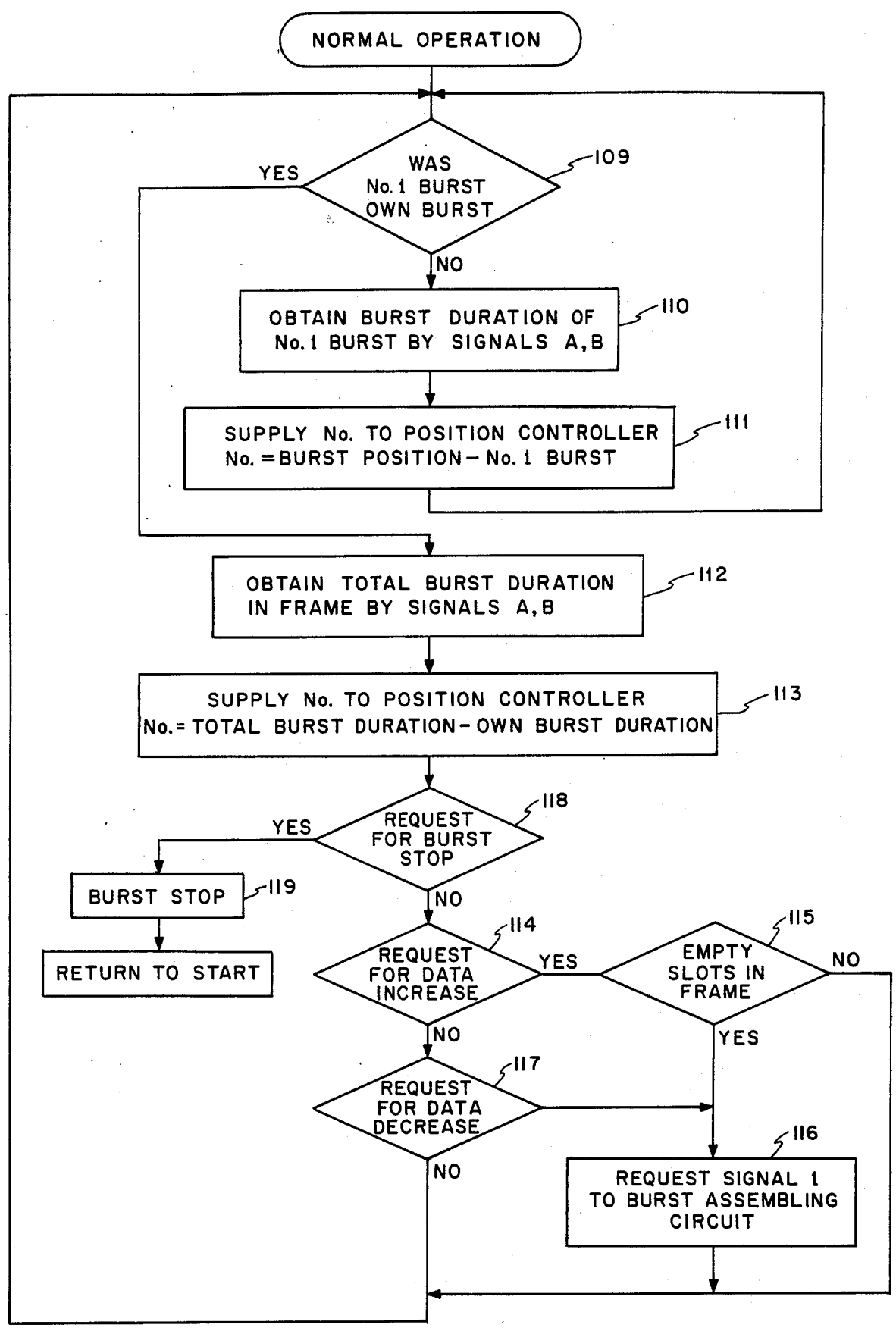

Then, based on the burst position detection signal E given from the detector 8 (FIG. 1), the controller 5 determines whether or not the position of the preamble is proper (steps 103 and 104, FIG. 7A). If the position is proper, in response to the head indication signal D (steps 105 and 106), the controller 5 calculates the total duration of the bursts on the basis of the burst duration signal A and the burst number signal B. Controller 5 supplies the total duration as the burst position indication signal H to the position controller 3 (steps 107 and 108). In response to the signal H and the superframe signal K, the position controller 3 causes the data assembling circuit 2 to deliver its own station's data $\alpha$ after the burst F (FIG. 3C).

After the initial access procedure as described, the bursts are sequentially shifted in the following manner. Based on the burst position detection signal E given from the detector 8, the controller 5 determines whether the burst No. 1 is the station's own burst $\alpha$ (steps 109 in FIG. 7B). If not, then the controller 5 determines the duration of the burst No. 1 in response to the burst duration signal A and the burst number signal B (step 110) while applying to the controller 3 a value which is produced by subtracting the duration of the number 1 burst from the position of the station's own burst $\alpha$ (step 111).

In conformity to the resulting difference, the controller 3 controls the data assembling circuit 2 to shift the station's own burst $\alpha$ (FIG. 3D). This shifting operation is performed at the reference station as well. On the other hand, if the burst No. 1 is the station's own burst $\alpha$, the controller 5 obtains the total burst duration (step 112). Then, it delivers to the controller 3 a value produced by subtracting the station's own burst duration from the total burst duration (step 113). Under this condition, when there is a request to increase the data length of the station's own burst $\alpha$ (step 114), based on the empty time slot signal C (step 115), the controller 5 controls the data assembling circuit 2 so as to increase the data length (step 116). If the request is for a decrease in data length (step 117), the controller 5 controls the circuit 2 to decrease the data length (step 116). Further, the controller 5 responds to a request for a burst stop (step 118) by cutting off the power supply to the demodulator 4 (step 119). Then, controller 5 returns to the initial operation, i.e., step 100. When another station such as a station B desires to transmit data under the condition shown in FIG. 8D, it will first transmit a preamble in an empty time slot as previously stated with reference to FIG. 8B. Then, it will transmit a burst $\beta$ as soon as the burst F is shifted to the end of the frame, as shown in FIG. 8E. These burst $\alpha$, $\beta$ and F are sequentially shifted as shown in FIG. 8F.

In summary, it will be seen that the present invention provides a TDMA communications apparatus which enables each earth station to adaptively vary the burst duration which is to be transmitted in response to its own instantaneous communications traffic needs. The variation is accomplished by means of a simple burst position control.

Many alternatives and modifications to the embodiment can be made within the scope of the invention defined by the appended claims. Therefore, the claims are to be construed to cover all equivalent structures.

I claim:

1. A time division multiple access (TDMA) communications system for enabling each of a plurality of stations served by said system to adaptively vary its own burst duration in a TDMA frame in response to their own instantaneous communications traffic needs, said system comprising:

transmit buffer memory means for temporarily storing data to be transmitted;

data assembling means coupled to said buffer memory means for assembling an output of said transmit buffer memory means into a predetermined burst format;

burst position control means coupled to control said data assembly means for shifting said assembled burst to a desired position in said TDMA frame;

transmitting means for transmitting said assembled burst into said format to a satellite;

receiving means for receiving all the bursts contained in said TDMA frames;

burst duration detector means coupled to an output of said receiving means for determining a duration of all of said received bursts and a duration of a burst at the head of said TDMA frame;

detector means for detecting when said transmitted burst is at the head of said TDMA frame; and channel controller means responsive to an output of said detector means and to an output of the burst duration detector means for causing the burst position control means to shift said transmitted burst at each predetermined period of time while causing the burst assembling device to vary the duration of said transmitted burst.

2. A method for enabling each station to adaptively vary its own burst duration in a TDMA frame responsive to their own communications traffic needs, said method comprising the steps of:

sequentially shifting each burst in said TDMA frame at a predetermined period, said shift being an amount corresponding to a duration of a burst at the head of said TDMA frame and occurring without changing an order of said each burst; and causing a shifted burst nearest to the end of said TDMA frame to vary the burst duration in response to a communications traffic of a station which desires a change in burst duration.

3. The method for varying the burst duration as claimed in claim 2, said TDMA frame having an initial access burst with a fixed burst duration, said method further comprising the steps of transmitting a burst in an empty time slot subsequent to said TDMA frame, and shifting said transmitted burst to a time position immediately after said initial access burst so as to enter said burst into the communications when said initial access burst is brought nearest to the end of said TDMA frame.

4. A telecommunication system comprising an earth-station-to-satellite-to-earth-station link, means in each of said earth stations for transmitting and receiving burst signals over said link during cyclically recurring time positions allocated to the corresponding earth station, said burst signals being distributed in time division multiple access time frames, said time frames including some idle and unused time capacity allocated to said burst signals for said corresponding earth stations, means responsive to detecting a start and an end of burst at any given earth station for varying the duration of said burst sent by said given earth station, whereby each station may adaptively vary its own burst duration in a TDMA frame responsive to its own communications traffic needs for eliminating the idle and unused time capacity allocated to said station; means for shifting the time positions in said time frame so that said idle and unused capacity becomes available for other earth stations, said shift being an amount corresponding to a duration of a burst at the head of said TDMA frame and occurring without changing an order of said each burst; and means for causing a shifted burst nearest to the end of said TDMA frame to vary the burst duration in response to a communications traffic of a station which desires a change in burst duration.

5. A telecommunication system comprising an earth-station-to-satellite-to-earth-station link, means in each of said earth stations for transmitting and receiving burst signals over said link during cyclically recurring time positions allocated to the corresponding earth station, said burst signals being sent in a format which begins with a unique word indicating the start of a burst and ends with an end of burst signal, said burst signals being distributed in time division multiple access time frames, said time frames including some idle and unused time capacity allocated to said burst signals for said corresponding earth stations, means responsive to detecting a start and an end of burst at any given earth station for varying the duration of the time position allocated to said burst sent by said given earth station, thereby eliminating the idle and unused time capacity allocated to said station; said means for varying the duration of the time periods comprising counter means started by said unique word and stopped by said end of burst signal for counting a normal amount of time pulses to establish the normal duration of a burst period, means for loading a normally predetermined count into said counter for enabling a count down for fixing a normally predetermined time period, means for varying said normal count down in response to the end of burst signal, whereby each earth station adaptively varies the duration of its burst transmission period in response to its own instantaneous traffic needs; and means for shifting the time positions in said time frame so that said idle and unused capacity becomes available for other earth stations.

6. The system of claim 5 and buffer memory means for receiving and storing data responsive to incoming traffic received by said earth station.

7. The system of claim 6 and means for assembling said buffer stored data into complete signals for burst transmission to said satellite, and means for shifting said assembled data to a position in said time frame which is selected on a basis of the varied duration of allocated time positions.

8. The system of claim 7 and means for independently operating said shifting means during each of said time frames.

* * * * *